United States Patent
Stehrer et al.

(10) Patent No.: US 9,532,440 B2
(45) Date of Patent: Dec. 27, 2016

(54) METHOD AND DEVICE FOR GENERATING A PLASMA JET

(71) Applicant: FRONIUS INTERNATIONAL GMBH, Pettenbach (AT)

(72) Inventors: Thomas Stehrer, Kirchberg-Thening (AT); Robert Nimmervoll, Tollet (AT); Florian Silbermayr, Eberstalzell (AT); Daniel Platzer, Wels (AT)

(73) Assignee: Fronius International GmbH, Pettenbach (AT)

( * ) Notice: Subject to any disclaimer, the term of this patent is extended or adjusted under 35 U.S.C. 154(b) by 15 days.

(21) Appl. No.: 14/468,545

(22) Filed: Aug. 26, 2014

(65) Prior Publication Data
US 2015/0060417 A1 Mar. 5, 2015

(30) Foreign Application Priority Data
Aug. 27, 2013 (AT) .............. A 50527/2013

(51) Int. Cl.
*B23K 10/00* (2006.01)
*H05H 1/40* (2006.01)
*H05H 1/34* (2006.01)

(52) U.S. Cl.
CPC .............. *H05H 1/40* (2013.01); *B23K 10/00* (2013.01); *H05H 1/34* (2013.01)

(58) Field of Classification Search
CPC ........... H05H 1/40; H05H 1/34; B23K 10/00; B23K 10/003; B23K 10/006
USPC ........... 219/121.51, 121.48, 121.59, 121.55, 75,219/121.36; 315/111.21
See application file for complete search history.

(56) References Cited

U.S. PATENT DOCUMENTS

| | | | | |
|---|---|---|---|---|
| 4,482,246 A | * | 11/1984 | Meyer | G01N 21/73 219/121.48 |
| 5,319,176 A | | 6/1994 | Alvi et al. | |
| 5,405,514 A | * | 4/1995 | Berman | B01J 19/088 204/164 |
| 5,585,147 A | * | 12/1996 | Ogawa | C03C 25/1095 427/255.24 |

(Continued)

FOREIGN PATENT DOCUMENTS

| AT | 413 953 B | 7/2006 |
|---|---|---|
| AT | 501 489 A1 | 9/2006 |

(Continued)

OTHER PUBLICATIONS

Austrian Office Action dated Jul. 4, 2014 in Austrian Application No. A 50527/2013 with English translation of the relevant parts.

(Continued)

*Primary Examiner* — Mark Paschall
(74) *Attorney, Agent, or Firm* — Collard & Roe, P.C.

(57) ABSTRACT

A method and a device for generating a plasma jet under atmospheric pressure for the surface treatment of workpieces has a supply line for the plasma-capable medium, and an apparatus for electrically exciting the plasma-capable medium by an electric arc periodically ignited between a cathode and an anode constructed as a nozzle. To achieve a highly effective plasma jet even at relatively low temperatures of the plasma jet, a heating apparatus for preheating the plasma-capable medium is arranged upstream of the apparatus for electrically exciting the plasma-capable medium.

17 Claims, 3 Drawing Sheets

(56) References Cited

U.S. PATENT DOCUMENTS

| | | | |
|---|---|---|---|
| 5,837,958 A | 11/1998 | Foernsel | |
| 7,638,734 B2 | 12/2009 | Prinz et al. | |
| 8,552,335 B2 * | 10/2013 | Rego | H05H 1/2406 |
| | | | 219/121.52 |
| 9,012,808 B2 | 4/2015 | Artelsmair et al. | |
| 2003/0006383 A1 | 1/2003 | Melnychuk et al. | |
| 2007/0221635 A1 * | 9/2007 | Boulos | H05H 1/42 |
| | | | 219/121.59 |
| 2009/0200276 A1 | 8/2009 | Mitterhumer et al. | |
| 2009/0266799 A1 | 10/2009 | Pauser et al. | |
| 2013/0248497 A1 | 9/2013 | Stoeger et al. | |

FOREIGN PATENT DOCUMENTS

| | | |
|---|---|---|
| AT | 11 556 U1 | 12/2010 |
| AT | 510 012 B1 | 1/2012 |
| CA | 2278751 C | 2/2006 |
| CN | 101128279 A | 2/2008 |
| CN | 101129100 A | 2/2008 |
| CN | 103262662 A | 8/2013 |
| DE | 29 13 464 C3 | 11/1983 |
| DE | 10 2009 015 510 A1 | 10/2010 |
| EP | 0 017 201 B1 | 10/1982 |
| EP | 0 761 415 B9 | 7/2008 |
| EP | 1 922 908 B1 | 4/2012 |

OTHER PUBLICATIONS

German Office Action dated Apr. 15, 2015 in German Application No. 10 2014 216 505.9 with English translation of the relevant parts.
Chinese Office Action dated Aug. 2, 2016 in Chinese Application No. 201410426246.5.

* cited by examiner

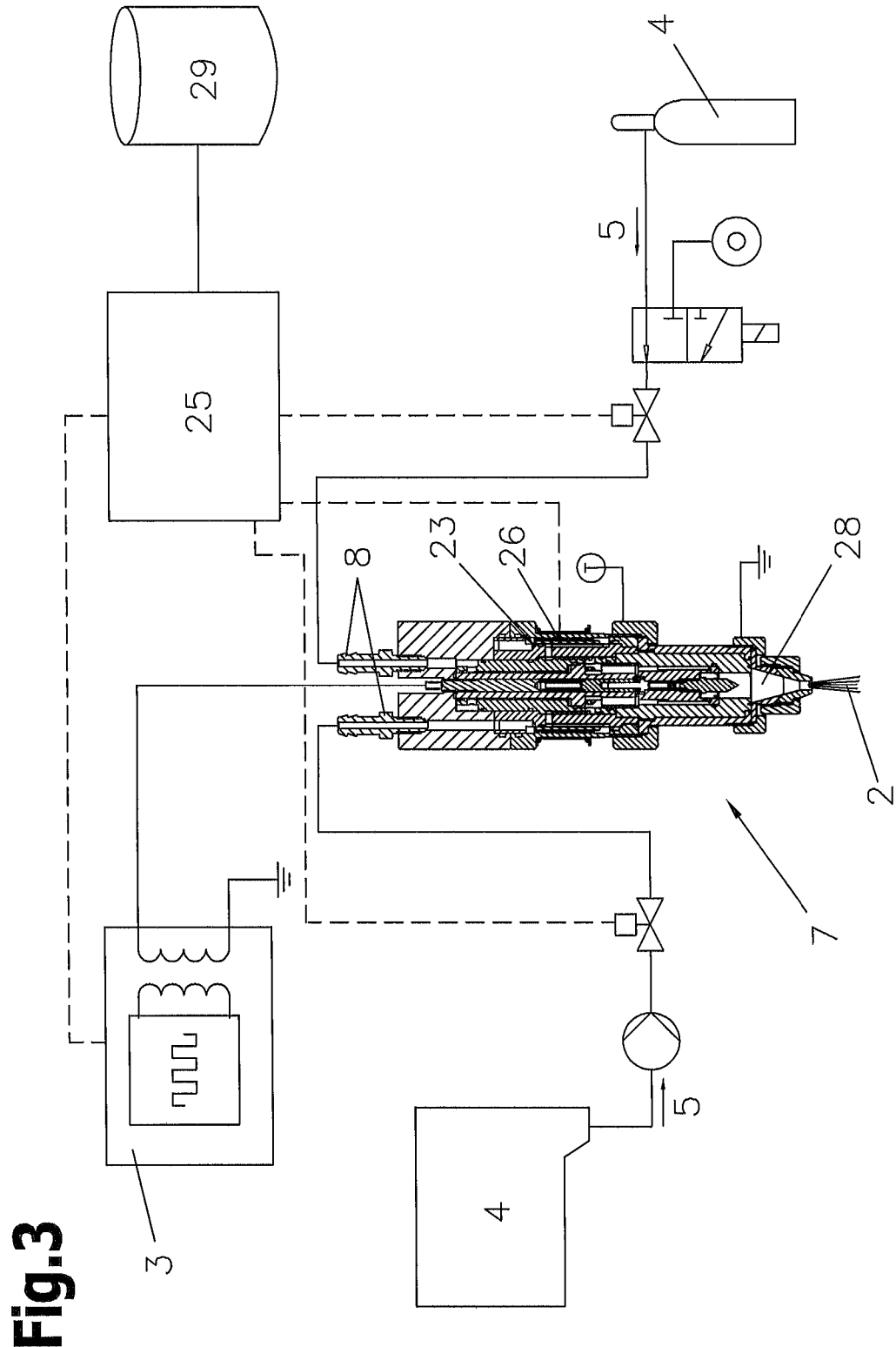

METHOD AND DEVICE FOR GENERATING A PLASMA JET

CROSS REFERENCE TO RELATED APPLICATIONS

Applicant claims priority under 35 U.S.C. §119 of Austrian Application No. A 50527/2013 filed Aug. 27, 2013, the disclosure of which is incorporated by reference.

BACKGROUND OF THE INVENTION

1. Field of the Invention

The invention relates to a method for generating a plasma jet under atmospheric pressure for the surface treatment of workpieces, the plasma jet being generated by electrically exciting a plasma-capable medium by means of an electric arc periodically ignited between a cathode and an anode constructed as a nozzle, and the plasma jet being directed through the nozzle in the direction of the surface to be treated.

Furthermore, the invention relates to a device for generating a plasma jet under atmospheric pressure for the surface treatment of workpieces, having a supply line for the plasma-capable medium, an apparatus for electrically exciting the plasma-capable medium by means of an electric arc periodically ignited between a cathode and an anode constructed as a nozzle.

2. Description of the Related Art

A plasma is understood to mean a gas, which contains free charge carriers, which is why electrically conductive gases are also often spoken of. Plasmas can be used in different ways, depending on pressure and temperature, for example in gas discharge lamps, in material deposition, for analysis, but also for processing workpieces and for disinfecting objects, body parts or wounds. With regards to the pressure of the plasma gas, a difference is made between low-pressure plasmas, normal-pressure plasmas or atmospheric-pressure plasmas and high-pressure plasmas. The subject invention is definitively directed towards the generation of plasma jets under atmospheric pressure at relatively low temperature and primarily conceived for uses for treating surfaces of workpieces or the like. The treatment of surfaces of workpieces with plasmas in low-pressure chambers is an already well-established and known method, which has already been used industrially for many years. Low-pressure plasmas stand out owing to good gap-penetration and high effectiveness. They are well-suited for treating small parts and also for bulk material. In addition to high investment costs, the required process time for draining the plasma chambers and the lack of an option for what is known as in-line execution of the plasma treatment are disadvantageous. The treatment of larger components also rapidly becomes uneconomical owing to the large vacuum chambers required therefor in the case of low-pressure plasmas.

Uses of atmospheric-pressure plasmas were primarily limited solely to what are known as thermal plasmas, which were used at plasma temperatures of a few 1000° C. for melting processes (such as e.g. welding, soldering, cutting, etc.). More recent developments now also allow the realization of what are known as non-thermal atmospheric-pressure plasmas, which also allow uses at lower plasma temperatures of a few 10° C. up to a few 100° C. Thus, novel interesting fields of application are being opened up for surface treatment by means of atmospheric-pressure plasmas, such as e.g. the cleaning and activation of materials or coating by means of plasma polymerization through to medical uses, such as the disinfection of open wounds.

A special gas is usually used for generating an atmospheric-pressure plasma (e.g. processed air, $N_2$, helium, argon), which is brought to the plasma state in a plasma burner by supplying energy. This plasma is blown onto the surface to be treated via a nozzle, whilst the plasma burner is moved over the workpiece with a defined spacing and speed. In this case, there are interactions of the plasma with the ambient air (quenching, mixing in of air molecules owing to the turbulent flows) and interactions with the surface to be treated. By far the most convincing advantage of this concept is the in-line capability and the simple integration of the process into existing production chains resulting therefrom. There are limitations when treating bulk material and small parts, insofar as the same cannot be placed in front of the plasma burner to a satisfactory extent. The oxidative effect of these plasmas is also undesired in some uses.

Due to the interaction of the plasma jet with the surface of the workpiece, the same is activated and/or cleaned. The cleaning effect is based, inter alia, on mechanical processes, owing to the bombardment of the surface with excited molecules, atoms and ions and also on chemical processes. In this case, the contaminants on the surface react with the excited particles in the plasma to form gaseous reaction products, which are finally removed by the gas flow. Uses of this process are to be found in microfine cleaning and the removal of oils, fats, silicones, oxides, fibres or thin coatings. A targeted changing of the surface structure (e.g. microstructuring) is also possible.

The activating effect of the plasma is achieved by chemical surface reactions. Depending on the base material and the composition of the plasma, radical locations or chemically-active groups (e.g. hydroxyl or carboxyl groups) are created on the surface. These effect a change of the surface energy and as a consequence a change of the surface properties of the treated workpieces. Thus, for example the wetting behavior of materials can be influenced in a targeted fashion. An originally hydrophobic surface (such as e.g. polypropylene) can be brought into a hydrophilic state by plasma activation. Both effects, the formation of chemically active groups and the change of the surface energy, can drastically improve the wetting behavior, layer formation and adhesion of coatings.

Many uses of the processes just described are to be found in the pretreatment of materials before bonding, soldering, welding, adhesive bonding, painting, printing and coating. The cleaning and activation of materials by means of atmospheric-pressure plasmas can replace chemical cleaning processes and the use of primers. The dispensing with solvents or other chemicals, which is connected therewith, makes plasma technology both economically and ecologically interesting.

By way of example, EP 0 761 415 B9 relates to a method for increasing the wettability of the surface of workpieces using atmospheric-pressure plasma, the plasma being generated by means of an electric arc excited at high frequency, which arc does not exit from the nozzle of the plasma burner.

A method for operating a steam plasma burner and a steam cutting device has become known from EP 1 922 908 B1, from which an optimized switchover from a transmitted mode to a non-transmitted mode for an optimized processing result emerges.

AT 510 012 B1 describes a steam plasma burner with an inductive heater for vaporising water or other liquids as plasma-capable medium. The steam plasma burner described therein can be used for cutting workpieces for example.

It is disadvantageous in the case of previous methods and devices for generating plasma jets, that at high activation of the plasma, an increase in the plasma temperature also results, for which reason specially activated plasmas are not suitable for all uses, for example surface pretreatment of sensitive workpieces.

SUMMARY OF THE INVENTION

The object of the present invention therefore consists in creating a method and a device for generating a plasma jet under atmospheric pressure for the surface treatment of workpieces or the like, by means of which a high degree of activation of the plasma is enabled even at relatively low temperatures of the plasma, in order to even allow uses on sensitive workpieces or even parts of the human or animal body. Disadvantages of known methods and devices should be avoided or at least reduced.

The object according to the invention is achieved with respect to the method in that the plasma-capable medium is preheated in a heating apparatus before the electrical excitation by means of the electric arc. By separating the thermal excitation of the plasma-capable medium from the conventional electrical excitation by means of the electric arc, an independent adjustment of the plasma power and the plasma temperature can be achieved. By means of the additional preheating of the plasma-capable medium before the electrical excitation by means of the arc, high plasma power or plasma activation can even be achieved at low plasma temperatures (what are known as cold plasmas). The core of the present invention is the preheating of the plasma-capable medium, which has influences both on the process of plasma generation and on the process of surface treatment of the workpieces or the like. The aim when generating a plasma for surface treatment of workpieces or the like is the generation of as many chemically active species as possible. A certain quantity of energy must be applied for generating chemically active species (e.g. radicals or ions). By heating the plasma-capable media, a part of this energy is supplied already in a thermal manner. The electrical energy required for generating the plasma is thereby reduced. This has positive influences on the ignition behavior of the plasma as a consequence and therefore also allows more leeway for the geometry of the plasma burner. Also, any excess electrical energy can be used for generating additional chemically active species. The pretreatment of workpieces using atmospheric-pressure plasmas is based to a large extent on chemical surface reactions. The interesting absorption and desorption processes are sometimes strongly dependent on the temperature. There is an ideal temperature range for each use, in order to increase the effect of the plasma pretreatment. At the same time, the plasma temperature should not get too high, so as to also be able to process thermally sensitive surfaces. The present invention is used for allowing optimal setting of the plasma temperature in a targeted fashion and separately from the activation of the plasma. By preheating the plasma-capable medium, one can therefore optimize the process temperatures independently of the parameters for plasma generation and thereby increase the effect of the surface pretreatment of the atmospheric-pressure plasma. These for example include greater activation and cleaning effects, higher process speeds, lower sensitivity with regards to sample spacing and the like. In addition, a new plasma chemistry can be made available due to the possibility of vaporising liquid plasma-capable media.

The plasma-capable medium is advantageously preheated to a temperature of 5° C. to 300° C. and regulated at this temperature in accordance with the respective use. This temperature range of the plasma jet permits a use in the case of many materials up to parts of the human or animal body.

The plasma-capable medium can be preheated inductively or by means of resistance heating elements or radiant heating elements. In the case of inductive heating, the heat transition resistance can be limited or reduced.

An optimal electrical excitation can be achieved if the electric arc for electrically exciting the plasma-capable medium is ignited periodically with a pulse duration smaller than 20 µs. Due to the relatively small pulse duration, the resultant temperature of the plasma can be kept relatively low. Depending on the requirement, the excitation frequency may for example lie in the range between 10 kHz and 100 kHz.

The temperature of the plasma jet directed out of the nozzle in the direction of the surface to be treated is preferably regulated between 10° C. and 500° C. It can be ensured by means of the temperature regulation that the surfaces to be treated are not overheated and the workpiece or the like is not destroyed.

A gas, a mixture of various gases, a liquid, a mixture of various liquids or also a mixture of one or a plurality of gas(es) with one or a plurality of liquid(s) can be used as plasma-capable medium. The gases and/or liquids used can be geared towards the respective use in a targeted fashion and optimally tailored to the material of the workpiece to be treated.

When using one or a plurality of liquids as plasma-capable medium, this liquid is preferably vaporized prior to the electrical excitation by means of the electric arc. The heating apparatus for vaporising the liquid plasma-capable medium can for example be formed by an induction heater, as is described in AT 510 012 B1.

The liquid used as plasma-capable medium can be mixed with a gas following the vaporization. Thus, one or a plurality of liquids can be mixed with one or various gases following the vaporization, in order to be able to achieve certain properties of the plasma for certain uses.

The object according to the invention is also achieved by an above-mentioned device for generating a plasma jet, a heating apparatus for preheating the plasma-capable medium being arranged upstream of the apparatus for electrically exciting the plasma-capable medium. Reference is made to the above description of the method for generating a plasma jet with regards to the advantages achievable thereby.

The heating apparatus is preferably constructed for preheating the plasma-capable medium to 5° C. to 300° C. and for regulation to the respective temperature in accordance with the respective use.

The heating apparatus for preheating the plasma-capable medium can be formed by an inductive heating apparatus, a resistance heating element or a radiant heating element.

The apparatus for electrically exciting the plasma-capable medium can be constructed by a generator for generating high-frequency current pulses with a duration smaller than 20 µs.

If a regulating apparatus is provided for regulating the temperature of the plasma jet directed out of the nozzle to the surface to be treated between 10° C. and 500° C., the respective desired temperature of the plasma jet can reliably be kept in the respective target range.

The supply line for the plasma-capable medium can be formed by at least one gas line and/or at least one liquid line.

A chamber for mixing the preheated plasma-capable medium with a further plasma-capable medium can be arranged between the heating apparatus for preheating the plasma-capable medium and the apparatus for electrically exciting the plasma-capable medium.

BRIEF DESCRIPTION OF THE DRAWINGS

The present invention is explained in more detail on the basis of the attached drawings. In the figures:

FIG. 3 shows a block circuit diagram of a device for generating a plasma jet.

DETAILED DESCRIPTION OF PREFERRED EMBODIMENTS

Figure 1:
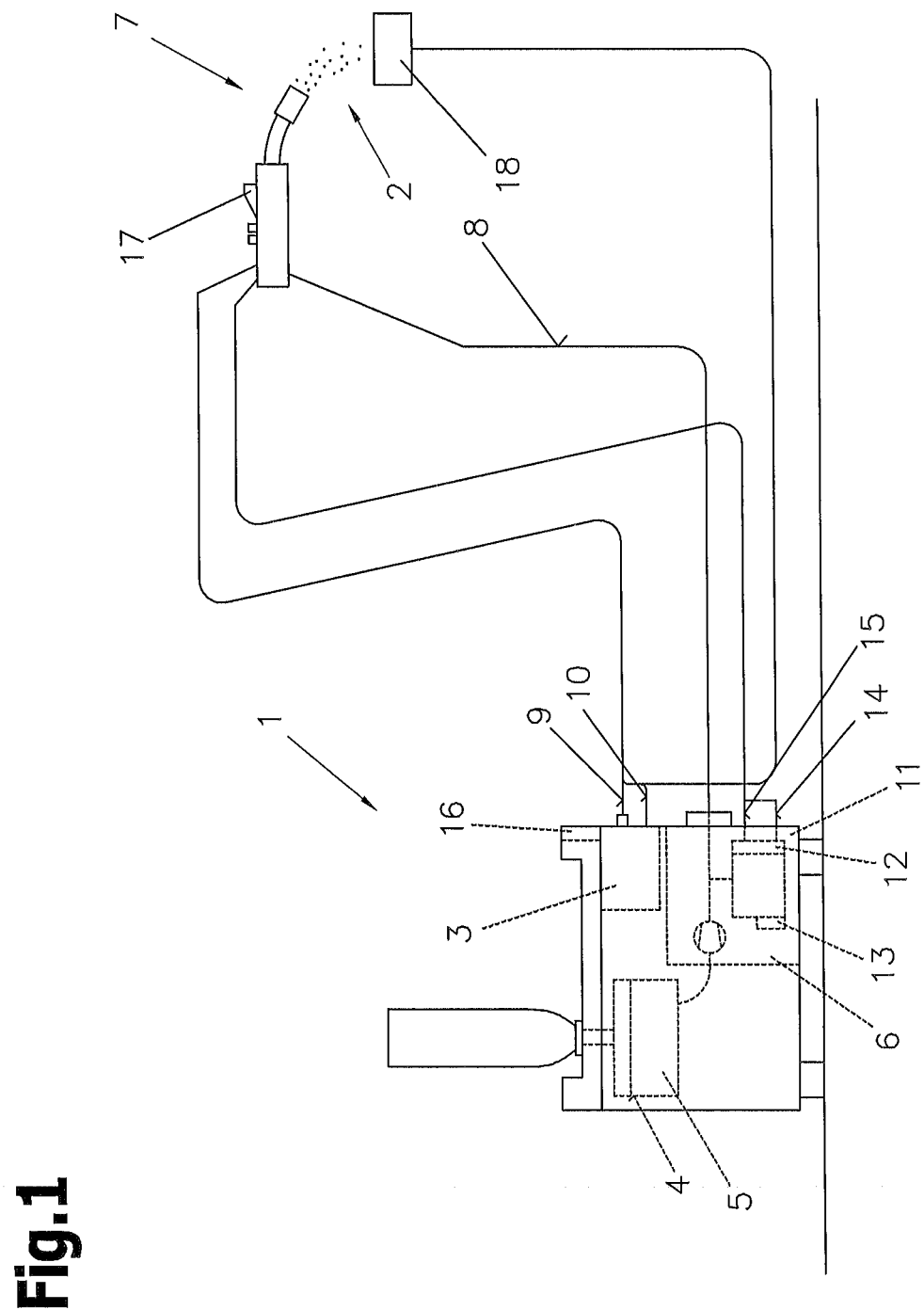
FIG. 1 shows a schematic illustration of a device for generating a plasma jet.

A device 1 for generating a plasma jet 2 is shown in FIG. 1. The device 1 comprises an apparatus 3 for electrically exciting a plasma-capable medium 5 provided in a container 4. The apparatus 3 for electrically exciting the plasma-capable medium 5 is connected to a control device 6. The plasma burner 7 is connected via a supply line 8 to the control device 6, so that the plasma burner 7 can be supplied with the plasma-capable medium 5 arranged in the container 4. The supply of the plasma burner 6 with electrical energy by the apparatus 3 takes place via the lines 9 and 10.

To cool the plasma burner 7, the same can be connected via a cooling circuit 11, if need be with the interposition of a flow monitor 12, to a separate fluid container 13 or the container 4. When commissioning the plasma burner 7, the cooling circuit 11 can be started by the control device 6 and thus cooling of the plasma burner 7 via the cooling circuit 11 can be achieved. To form the cooling circuit 11, the plasma burner 7 is connected via cooling lines 14, 15 to the liquid container 13 or the container 4. The cooling circuit 11 can also be formed directly via the liquid supply of the plasma burner 7 from the container 4 via the supply line 7, as a result of which only a single liquid supply to the plasma burner 7 is required.

Furthermore, an input and/or display device 16 can be provided, via which the very different parameters or operating modes of the device 1 can be adjusted and displayed. The parameters adjusted by means of the input and/or display device 16 are forwarded to the control device 6, which correspondingly controls the individual components of the device 1.

The plasma burner 7 can have at least one operating element 17, by means of which the user can inform the control device 6 from the plasma burner 7 that processing should be carried out. Furthermore, pre-sets can be made at the input and/or output device 16 for example. Of course, further operating elements can be arranged on the plasma burner 7, by means of which one or a plurality of operating parameters of the device 1 can be adjusted from the plasma burner 7. To this end, these operating elements 17 can be connected directly to the control device 6 via lines or via a bus system. The operating element 17 can also contain a display device, for example an LCD display, so that corresponding settings, parameters or information can be shown to the user at the plasma burner 7.

Following the actuation of the operating element 17, the control device 6 activates the individual components required for the plasma processing method. For example, first a pump (not illustrated) and the apparatus 3 are controlled, as a result of which a supply of the plasma burner 7 with the plasma-capable medium 5 and also electrical energy is started. Subsequently, the control device 6 activates the cooling circuit 11, so that cooling of the plasma burner 7 is enabled. By supplying the plasma burner 7 with the plasma-capable medium 5 and electrical energy, the plasma-capable medium 5 is converted in the plasma burner 7 into the plasma jet 2, which can be used for treating the surface of a workpiece 18 or the like.

Figure 2:
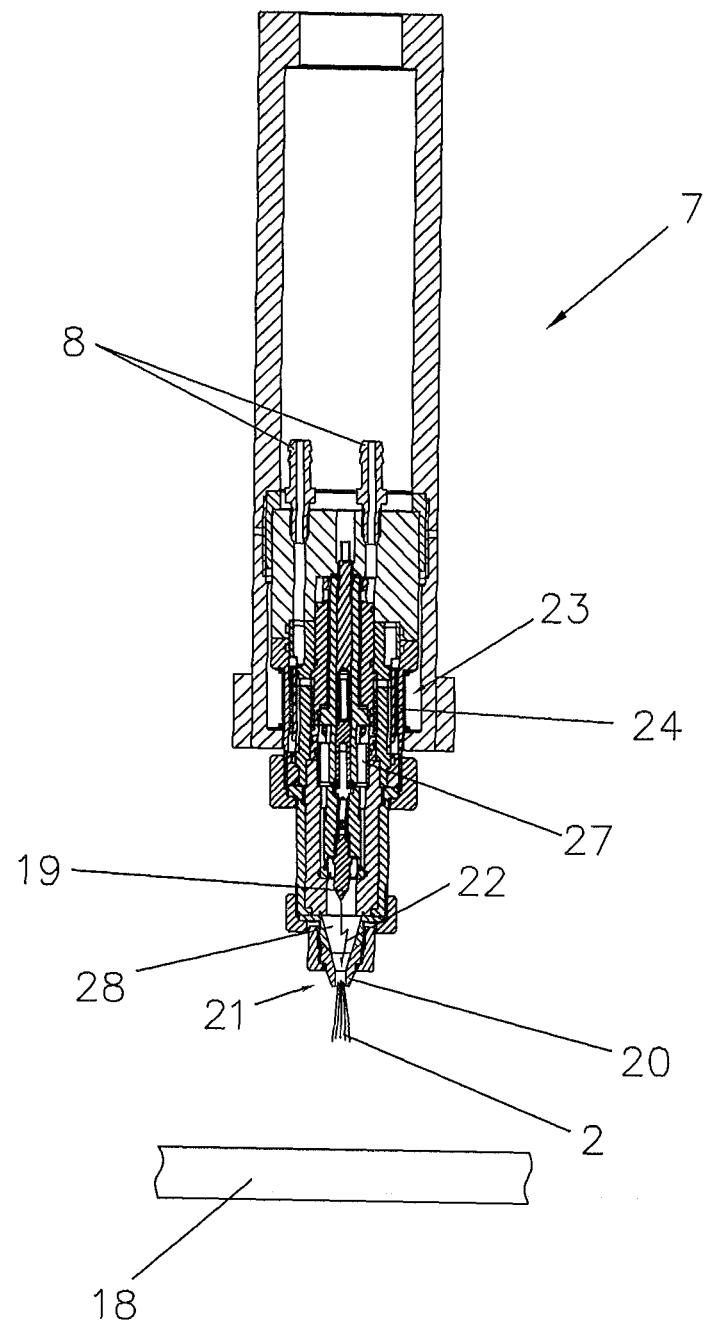
FIG. 2 shows the structure of an embodiment of a plasma burner in a sectioned illustration.

FIG. 2 shows the structure of an embodiment of a plasma burner 7 in a sectioned illustration. Accordingly, the plasma burner 7 comprises at least one supply line 8 for the plasma-capable medium 5 (not illustrated), a cathode 19 and an anode 20 constructed as a nozzle 21. Of course, cathode 19 and anode 20 can also be used vice versa. An electric arc 22 is ignited periodically between the cathode 19 and the anode 20, which electrically excites the plasma-capable medium 5 supplied via the supply lines 8. According to the invention, a heating apparatus 23 for preheating the plasma-capable medium 5 is additionally arranged, which in the illustrated example is constructed as an inductive heater 24, which is arranged around the line for the plasma-capable medium 5, which is arranged in a thread-like manner. In addition, a heating apparatus for vaporising a liquid, plasma-capable medium 5 (not illustrated) can be provided, downstream of which a chamber 27 for mixing a plurality of plasma-capable media 5 is arranged if needs be. The mixture of plasma-capable media 5 is then conveyed into the combustion space 28, in which the electric arc 22 is periodically ignited, where the plasma jet 2 is generated and driven out of the nozzle 21 in the direction of the workpiece 18 or the like to be treated. The spacing between cathode 19 and anode 20 is constructed to be larger compared to conventional plasma burners 7. By specially configuring this spacing, but also the combustion space 28 between cathode 19 and anode 20 and configuring the nozzle 21, the swirling of the plasma-capable medium 5 and as a consequence the width of the plasma jet 2 can be adjusted and adapted to the respective use case. Owing to the larger distance between cathode 19 and anode 20, it is advantageous if the ignition of the electric arc 22 is ignited with a higher frequency, usually in the range between 10 kHz and 100 kHz. As the electric arc 22 does not exit from the nozzle 21, workpieces 18 made from non-electrically-conductive material, for example plastics through to biological tissues can be treated using the plasma jet 2.

FIG. 3 finally shows a block circuit diagram of a device 1 for generating a plasma jet 2 according to the present patent application. The device 1 comprises the plasma burner 7 described in FIG. 2, one or a plurality of containers 4 for a gaseous or liquid plasma-capable medium 5 and an apparatus 3 for electrically exciting the plasma-capable medium 5 in the plasma burner 7. Advantageously, a regulating apparatus 25 is provided for regulating the temperature of the plasma jet 2, in that the temperature is measured with a suitable temperature sensor 26 at a suitable location and, depending on the measured temperature, the apparatus 3 for electrically exciting the plasma-capable medium 5 or the supply lines 8 for the plasma-capable medium 5 are correspondingly influenced. The temperature measurement of the plasma jet 2 can—as illustrated in FIG. 3—take place indirectly in the region of the heating apparatus 23 or else directly in the region of the nozzle 21 (not illustrated). The temperatures of the plasma jet 2 required for certain surface treatments may be contained in corresponding tables or databases 29.

Using the present method and the present device for generating a plasma jet 2 under atmospheric pressure, surfaces of workpieces 18 or the like can even be suitably treated at low temperatures and in particular, surfaces of workpieces 18 can be pretreated using the plasma jet 2 before painting, before welding, before adhesive bonding or the like. By preheating the plasma-capable medium 5, a separate adjustment of the electrical and thermal excitation of the plasma can take place.

Example

For pretreating aluminium for a subsequent welding, adhesive bonding or painting use, it may be advantageous to condition the surface such that the wettability and the adhesion of the aluminium surface are increased. Contact angle measurement constitutes a good option for the measuring of changes to the surface. Inter alia, the surface tension of solid bodies can be analysed before and after treatment has taken place with atmospheric-pressure plasma using this measurement. Increasing the surface tension is always a very good indicator in this case that the wettability and the adhesion have been improved. The aluminium used in this example has a surface tension of 32 mN/m in the untreated state. If one then carries out a treatment of the surface using atmospheric-pressure plasmas, the surface tension can be increased considerably.

In this example, an atmospheric-pressure plasma burner with an integrated inductive heater 24 is used as heating apparatus 23. The diameter of the outlet opening of the nozzle 21 can be varied in a range between 1 mm and 6 mm, the spacing of the cathode 19 from the anode 20 is at least 1 cm and the internal diameter of the combustion space 28 is essentially 1 cm. The heating power of the inductive heater 24 can be regulated in an infinitely variable manner from 0 W to 500 W. A temperature sensor 26 is provided in the region of the heating apparatus 23 for the temperature regulation. The plasma-capable medium 5 is supplied to the plasma burner 7 via a supply line 8 and can be heated in the heating apparatus 23. Pressure and flow of the supplied plasma-capable medium 5 is in this case regulated in such a manner that a flow in the range of 20 liters of gaseous plasma-capable medium 5 per minute into the combustion space 28 is ensured. In order to realize the influx of the plasma-capable medium 5 into the combustion space 28 in a manner suitable for plasma generation, the inlet consists of a plurality of influx openings, which are arranged in such a manner that a flow vortex can be created in the combustion space 28. Positive high-voltage pulses with a frequency of 20 kHz and a maximum voltage amplitude of 20 kV are used for the plasma generation. For treating the aluminium workpiece, the plasma burner is guided over the material surface with a defined spacing of 3.5 mm and a defined speed of 50 cm/min.

If, in an experiment, one then uses processed air as plasma-capable medium 5 without switching the heating apparatus 23 on, a conventional treatment with atmospheric-pressure plasma can be carried out. The surface tension of the aluminium can thereby be increased to 55 mN/m. By switching on the heating apparatus 23 and increasing the temperature of the plasma-capable medium 5, this value can then be increased further. If one regulates the temperature of the air before the generation of the plasma to a value of 200° C., the surface tension of the aluminium can thus be increased to 65 mN/m. It becomes even more interesting if one also changes the plasma chemistry. By using water as starting medium and a suitable regulation of the heating apparatus 23, one can provide steam with a temperature of 200° C. as plasma-capable medium 5. Using an atmospheric-pressure plasma generated from this medium, one can then increase the surface tension of aluminium to 72 mN/m. The numeric values given are used to clarify this exemplary use and are not to be understood as limiting.

What is claimed is:

1. A method for generating a plasma jet under atmospheric pressure for the surface treatment of workpieces, wherein the plasma jet is generated by electrically exciting a plasma-capable medium by means of an electric arc periodically ignited between a cathode and an anode constructed as a nozzle, and the plasma jet is directed through the nozzle in the direction of the surface to be treated, wherein the plasma-capable medium is preheated in a heating apparatus before the electrical excitation by means of the electric arc, wherein thermal excitation of the plasma-capable medium takes place separately from the electrical excitation by the electric arc, and wherein the temperature of the plasma jet directed out of the nozzle in the direction of the surface to be treated is regulated between 10° C. and 500° C.

2. The method according to claim 1, wherein the plasma-capable medium is preheated to a temperature of 5° C. to 300° C.

3. The method according to claim 1, wherein the plasma-capable medium is preheated inductively.

4. The method according to claim 1, wherein the plasma-capable medium is preheated by means of resistance heating elements or radiant heating elements.

5. The method according to claim 1, wherein the electric arc for electrically exciting the plasma-capable medium is ignited periodically with a pulse duration smaller than 20 ρs.

6. The method according to claim 1, wherein a gas is used as plasma-capable medium.

7. The method according to claim 1, wherein a liquid is used as plasma-capable medium.

8. The method according to claim 7, wherein the liquid used as plasma-capable medium is vaporized prior to the electrical excitation by means of the electric arc.

9. The method according to claim 8, wherein the liquid used as plasma-capable medium is mixed with a gas following the vaporization.

10. A device for generating a plasma jet under atmospheric pressure for the surface treatment of workpieces, having a power supply, a supply line for the plasma-capable medium, an apparatus for electrically exciting the plasma-capable medium by means of an electric arc periodically ignited between a cathode and an anode constructed as a nozzle, wherein a heating apparatus for preheating the plasma-capable medium is arranged upstream of the apparatus for electrically exciting the plasma-capable medium, wherein thermal excitation of the plasma-capable medium takes place separately from electrical excitation by the electric arc, and wherein a regulating apparatus is provided for regulating the temperature of the plasma jet directed out of the nozzle to the surface to be treated between 10° C. and 500° C.

11. The device according to claim 10, wherein the heating apparatus is constructed for preheating the plasma-capable medium to 5° C. to 300° C.

12. The device according to claim 10, wherein the heating apparatus for preheating the plasma-capable medium is formed by an inductive heating apparatus.

13. The device according to claim 10, wherein the heating apparatus for preheating the plasma-capable medium is formed by a resistance heating element or a radiant heating element.

14. The device according to claim 10, wherein the apparatus for electrically exciting the plasma-capable medium is constructed by a generator for generating high-frequency current pulses with a duration smaller than 20 μs.

15. The device according to claim 10, wherein the supply line for the plasma-capable medium is formed by a gas line.

16. The device according to claim 10, wherein the supply line for the plasma-capable medium is formed by a liquid line.

17. The device according to claim 10, wherein a chamber for mixing the preheated plasma-capable medium with a further plasma-capable medium is arranged between the heating apparatus for preheating the plasma-capable medium and the apparatus for electrically exciting the plasma-capable medium.

* * * * *

UNITED STATES PATENT AND TRADEMARK OFFICE
CERTIFICATE OF CORRECTION

PATENT NO. : 9,532,440 B2  
APPLICATION NO. : 14/468545  
DATED : December 27, 2016  
INVENTOR(S) : Stehrer et al.

Page 1 of 1

It is certified that error appears in the above-identified patent and that said Letters Patent is hereby corrected as shown below:

In the Claims

In particular, in Column 8, Line 36, (Line 3 of Claim 5) please change "ps" to correctly read: -- µs --.

Signed and Sealed this  
Eleventh Day of April, 2017

Michelle K. Lee  
*Director of the United States Patent and Trademark Office*